Oct. 24, 1961 H. RUDOLPH 3,005,871

TELEPRINTER SIGNAL TRANSMISSION APPARATUS

Filed March 17, 1959 4 Sheets-Sheet 1

Inventor:
HANS RUDOLPH

By Toulmin & Toulmin
Attorneys

Oct. 24, 1961 H. RUDOLPH 3,005,871

TELEPRINTER SIGNAL TRANSMISSION APPARATUS

Filed March 17, 1959 4 Sheets-Sheet 2

Inventor:
HANS RUDOLPH

By Toulmin & Toulmin
Attorneys

Oct. 24, 1961 H. RUDOLPH 3,005,871

TELEPRINTER SIGNAL TRANSMISSION APPARATUS

Filed March 17, 1959 4 Sheets-Sheet 3

Inventor:
HANS RUDOLPH

By Toulmin & Toulmin
Attorneys

Inventor:
HANS RUDOLPH
By Toulmin & Toulmin
Attorneys 3,005,871

TELEPRINTER SIGNAL TRANSMISSION APPARATUS

Hans Rudolph, Munich-Solln, Germany, assignor to Siemens & Halske Aktiengesellschaft, Berlin and Munich, Germany, a German company Filed Mar. 17, 1959, Ser. No. 799,910
Claims priority, application Germany Mar. 21, 1958
11 Claims. (Cl. 178—26)

Figure 1A:
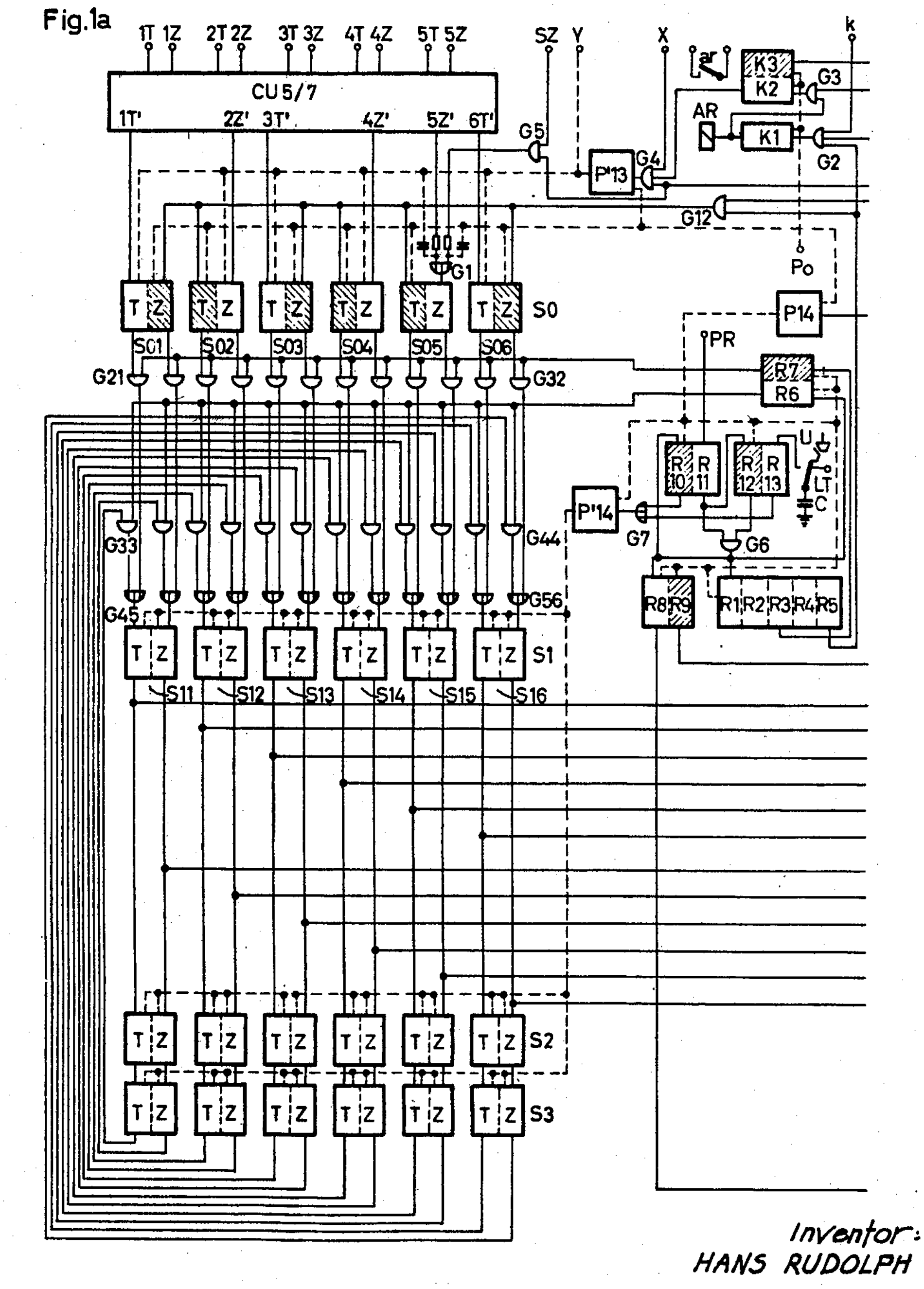

This invention relates to teleprinter signal transmission apparatus and is concerned with automatic error correction in such apparatus.

When teleprinter signals are transmitted over transmission paths which are liable to interference, in particular over radio paths, special precautions are often taken to keep the number of transmission errors caused by interference as low as possible. For this purpose a protective or error-detecting code is used and the apparatus may be designed to provide correction of mutilated signals by means of automatic repetition.

The protective code normally used is a 7-unit code in which each character consists of three spaces and four marks and, as teleprinter apparatus normally operates with a 5-unit code (for example, the international telegraph alphabet No. 2), a code converter must be provided to convert teleprinter signals in the 5-unit code to corresponding signals in the 7-unit code. Automatic error correction is particularly applicable to transmission systems having a large capacity and accordingly the invention will be described with reference to a multiplex system having at least two channels. In such systems a pulse distributor is provided which at the transmitter serves both to interleave the signals belonging to the different channels and also to control the conversion of the individual character combinations from the parallel to the sequential form.

The object of the invention is to provide telegraph signal transmission apparatus comprising a code converter for translating teleprinter signals from a first code to a second code, a pulse distributor, a first storage device controlled by the output of the code converter, a second storage device, normally operative means for passing the character transferred to the first storage device also to the second storage device, at least two further storage devices, means responsive to pulses from the pulse distributor for transferring characters sequentially from the second storage device to successive ones of the further storage devices, normally inoperative means for transferring the character stored in the last storage device to the second storage device, a reading device for reading out the pulse combination of the character stored in the second storage device in time sequence, and means responsive to the receipt of a repetition-request signal for making said normally operative means inoperative and said normally inoperative means operative so that the reading device reads out in succession the characters passed to the second storage device from the last storage device.

The term "gates" is used to describe circuit arrangements which utilize logical elements and which contain rectifiers, neons, diodes or secondary emission electronic switching tubes; they may be, for instance, AND elements or OR elements. AND elements are circuit arrangements which deliver a potential at the output when, and only when all inputs are excited simultaneously; OR elements, in contrast, deliver a potential at the output when either, or any, of the inputs is excited.

It is a further object of the invention to provide apparatus constructed in such a way that an alarm is triggered off when too many, or not enough spaces are counted in the space element counter.

If the character combinations are applied to the apparatus in time sequence, these combinations may be stored in a series-parallel-converter and fed from here into the code-converter; when the transmission of a message is finished, however, repeated acceptance of the converted combination into the first storage device must be prevented.

In the transmission of 7-unit code signals with three spaces, only the first six units of each 7-unit combination need be formed by the code converter and consequently all storage devices may consist of only six storage elements each; it is a further object of the invention to provide apparatus in which the seventh unit is transferred directly into the second bi-stable circuit from the space element counter in accordance with the state of the second or third counting stage of the space element counter.

Before a detailed description of apparatus according to the invention is given, the principle of operation of the whole transmission system will be explained below as far as it appears to be necessary and advisable for the understanding of the invention.

The system to be described serves for the simultaneous transmission of two or more teleprinter messages according to the time-multiplex principle. The description will be based on a two-channel system, but it will be shown that such a system can be extended in a simple way to three, four, or even more channels.

As it would be a disadvantage to employ special signal transmitters and receivers for teleprinter connections which requires a special protection against transmission errors and which are suited directly for, e.g. the 7-unit code, the transmission systems intended for this purpose are provided with code converters. In the terminal equipment and in feeder lines, if any, the normal 5-unit code is used, and each signal of the 5-unit code is translated into a corresponding signal of the 7-unit code by means of a (5/7)-code converter, before it is sent over the path that is liable to interference. At the end of this path each of the signals that are received without mutilation is re-translated into the corresponding signal of the 5-unit code by means of a (7/5)-converter and fed into the receiver.

The receiver includes means for counting the number of space or mark elements in each received 7-unit code signal. If the space-/mark ratio is 3:4 the respective signal is accepted as being undistorted. If there is a deviation from this 3:4 ratio, mutilation of the signal must have occurred; the receiving arrangement orders the transmitter of its own station (for instance by means of a voltage pulse) to send to the distant station a request for a repetition. The repetition-request signal consists of a combination of the 7-unit code of the same type as is used for characters, i.e. it also has a space- to mark ratio of 3:4; it is called hereinafter an RQ signal.

There are altogether 32 different combinations in the 5-unit code, and a similar number of combinations must be used in the 7-unit code. During a pause in a message a circuit being operated with a 5-unit code is kept in the condition of continuous space current; when a clearing signal is required the condition is changed to continuous mark current. These two continuous states must be translated in a time-multiplex transmission system also in the form of 7-unit code signals with a space-/mark ratio of 3:4, because any other form of signal would be regarded by the receiver as a mutilated signal, and would give rise to continuous repetition. The 7-unit combination provided for the transmission of the continuous mark state is usually denoted by $\alpha$, and that for the continuous space state by $\beta$. As a total of 35 7-unit combinations with a space-/mark unit ratio of 3:4 are available, one combination is left for the RQ signal. In a two-channel time-multiplex system of the type forming the basis of the present invention, single characters from the two channels are transmitted alternately. If the two channels are called channel A and channel B, the seven units of a character belonging to channel A are immediately followed by the seven units of a character belonging to channel B, followed directly again by the seven units of the next-following character of channel A, and so on. The sequence in time of the combinations and of the elements constituting the combinations is controlled by a distributor. In the course of one revolution of the distributor, a signal of channel A is transmitted in the first half of the period, and a signal of channel B in the second half. The transmitter and the receiver at each station both contain distributors. All the distributors must run synchronously and in the correct phase. The necessary synchronising systems are well known and are, therefore, not described in detail herein.

If a mutilated signal is received, e.g. in channel A, a repetition process is triggered off in this channel which operates in the following way (the transmission of information in channel B remaining completely unaffected):

The transfer transmitter which normally passes the characters that are correctly received to the teleprinter receiver in the 5-unit code, is blocked for the duration of four revolutions of the receiver distributor, even though in the meantime unmutilated signals may be received. The transmitter at the receiving station receives the order to request a repetition (e.g. in the form of a voltage pulse).

The transmitter interrupts the transmission of the message at the beginning of the next following revolution of the transmitter distributor, and transmits back the RQ signal to the distant station; then the transmitter repeats the last three signal combinations i.e. the three characters which directly preceded the RQ signal. The repetition process extends, therefore, over four distributor revolutions.

The RQ signal is received in the distant station with a time delay corresponding to the path transmission time and initiates a repetition process identical with the one described above. Since the transfer transmitter is blocked for four revolutions of the distributor, neither the RQ signal, nor the three following (repeated) signals are passed on to the teleprinter receiver. The RQ signal, which is sent out before the characters are repeated, arrives at the first station while the transfer transmitter is still blocked; it has, therefore, no effect. Subsequently, however, the blocking period is finished and the three following (repeated) characters are passed on to the receiver, if they are received correctly this time. The first of these repeated characters is the one that was mutilated and the next two characters are the ones which were suppressed, together with the mutilated signal, when they were received for the first time. This completes the repetition process and normal transmission can be continued. If an RQ signal is itself mutilated, the process of repetition still proceeds as above, because there is no difference between the effect of a mutilated signal and that of a correctly received RQ signal.

Figure 1B:
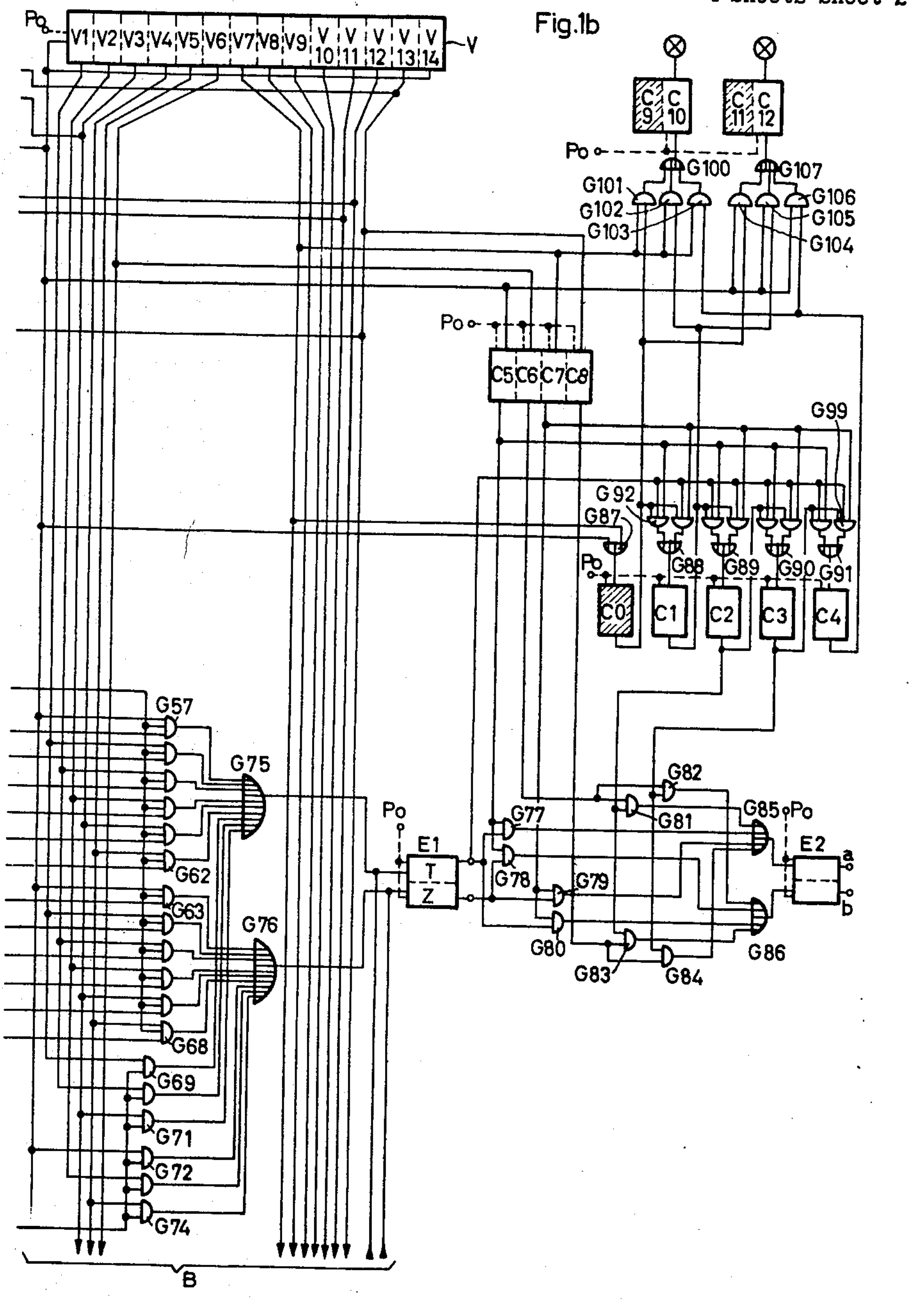
Figure 2:
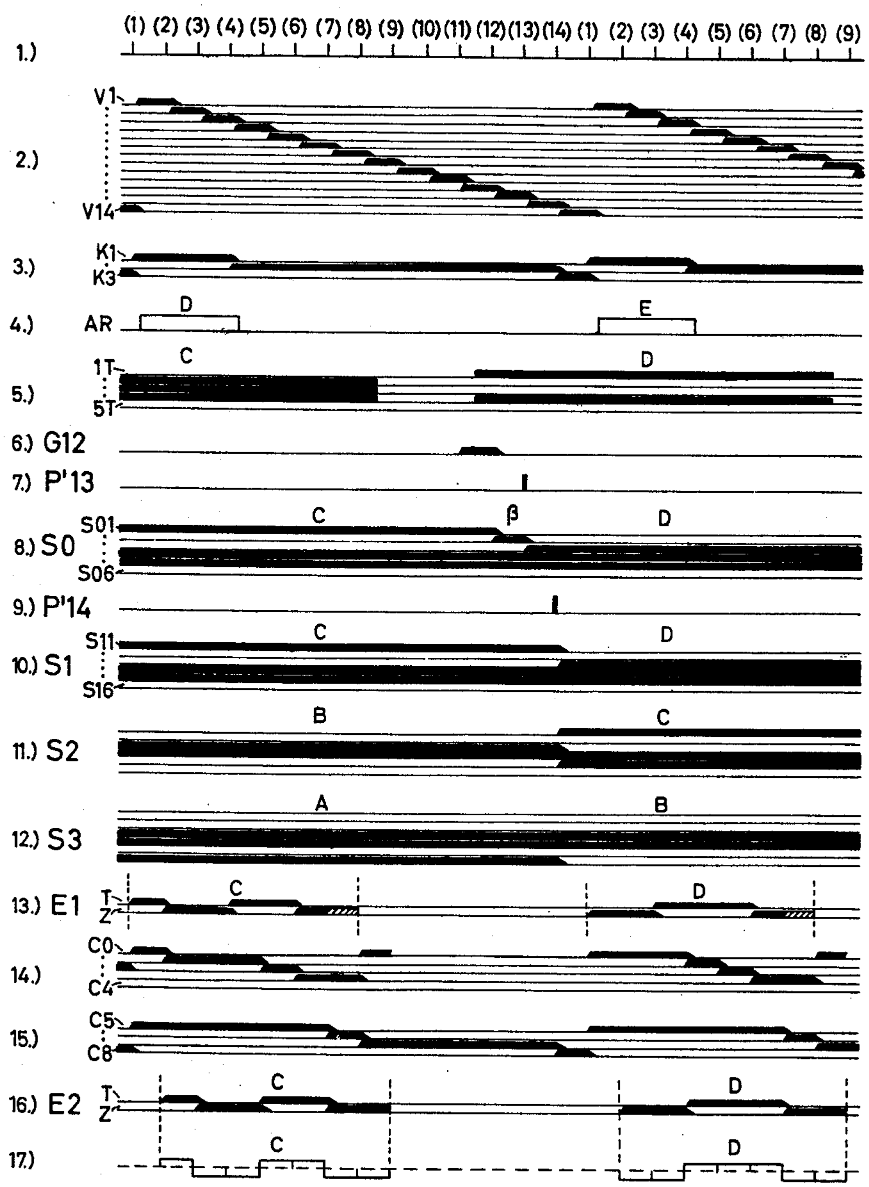
Figure 3:
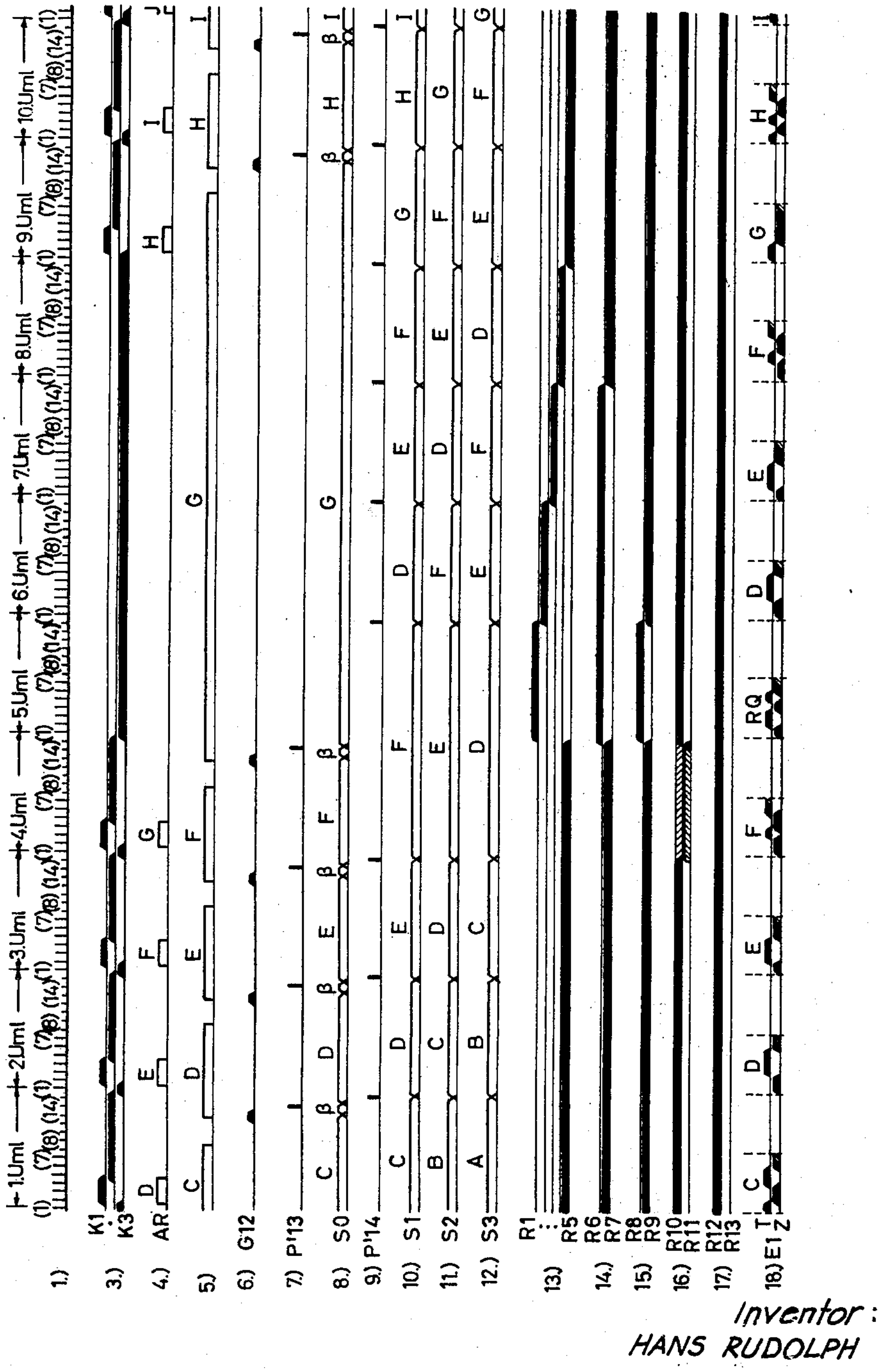

One embodiment of the invention will now be described with reference to the accompanying drawings in which:

FIGURE 1(*a* plus *b*) is a block diagram showing all the essential parts of the transmitting apparatus for one channel and with some parts which are common to two channels, FIGURE 2 is a diagram showing the time relationship between the various processes taking place in one channel during normal transmission, and FIGURE 3 is a diagram showing the time relationship between the most important processes taking place during repetition.

A transmission distributor common to two channels is provided. It consists of a 14-step counter chain which may be designed as a binary or as a ring counter. In FIGURE 1*b* the distributor is represented by individual counter steps V1 to V14. It is switched by a clock pulse P0 which is supplied from outside. Arrangements for the generation of clock pulses are well-known and therefore, for simplicity, no such arrangement is shown in FIGURE 1. The signal to be transferred is applied to code converter CU 5/7 (see FIGURE 1*a*) in the form of a 5-unit code combination via five terminal pairs 1T and 1Z to 5T and 5Z respectively. A voltage is applied to the terminal 1T and at the same time the terminal 1Z is earthed when the first unit of the 5-unit combination is a space; and a voltage is applied to terminal 1Z and terminal 1T is earthed when the first unit of the 5-unit combination is a mark. The same applies to the further terminal pairs 2T and 2Z to 5T and 5Z which are allocated to the second to the fifth units of the 5-unit combination. The code converter has six output terminals 1T′, 2Z′, 3T′, 4Z′, 5Z′ and 6T′ which are allocated to the first six units of the 7-unit code combination. An output terminal for the seventh unit is omitted because its polarity is already fixed in a definite manner through the knowledge of the polarities of the first six units and the condition of the 3:4 ratio; the seventh unit is added later in the correct polarity. The terminal 1T′ delivers an output voltage if the first unit of the 7-unit code is a space; this terminal, however, delivers earth potential if the first unit is a mark. The conditions are reversed for the second unit at terminal 2Z′; this terminal has a voltage if the second unit is a mark and no voltage if the second unit is a space. For the remaining terminals also it may be seen from FIGURE 1 whether the presence of voltage signifies space current or mark current for the respective unit. The voltages delivered by the code converter are applied to a first storage device S0 which consists of six storage elements S01 to S06. Each storage element is constructed as a bi-stable multivibrator circuit in a known manner. In order to transfer a multivibrator circuit from one stable state to the other a further voltage pulse is required in addition to the applied voltage which pulse determines the exact moment for the multivibrator action. The said first storage device S0 has a rest state in which the individual store elements are in the state shown by shading. The state illustrated represents the sequence ZTZTTZ (wherein T denotes space current and Z denotes mark current) and this sequence corresponds to the first six units of the idle signal $\beta$. The combination $\beta$ corresponds, as mentioned above, to the continuous space state in the 5-unit code which is sent out, for instance, during pauses in a message. In order to bring the store S0 into the rest state a voltage must be delivered to the corresponding inputs of the store elements from the gate G12; as the clock pulse P0 is also applied to the inputs of this storage device (pulse lines have been represented generally in FIGURE 1 as broken lines), the changeover of the storage elements occurs with the next following clock pulse if they are not already in the rest state. If the storage device S0 is in the rest state ($\beta$) shown and if the 5-unit combination of a message element is present at the input terminals 1T and 1Z to 5T and 5Z, the first six units of the respective 7-unit combination are transferred from the code converter to the storage device S0 by a single pulse which is delivered by a pulse generator P′13. By means of an OR element G1 at the Z input of the storage element S05 it is possible to change over this storage element both from the code converter (terminal 5Z′) and from the input terminal SZ (via and AND element G5) to the mark state. While the message is being transmitted, the terminal SZ must be connected to earth potential; provide that a new 5-unit combination has been applied to the input, the output of the code converter alone then controls the state of S05. Otherwise, the combination $\beta$ remains in the storage device. For the clearing signal α (connection interrupted) a voltage is applied to the terminals SZ; a short term application of a voltage to the second input of G5 (which is delivered by the distributor) and a pulse from P0 cause S05 to change over, whereas the remaining store elements remain in the rest state. The combination α is thus stored in the first storage device S0 which combination corresponds to the continuous mark current state in the 5-unit code.

In general, tape-punching machines produce tapes on which the characters are recorded in the 5-unit code and tape-reading machines operate with such tapes. If the tape-reading machine is in the immediate neighborhood of the multiplex arrangement it is advisable that five of the contacts controlled by the feeler arrangement of the tape-reader apply the voltages corresponding to the 5-unit combination directly via ten lines to the input (terminals 1T and 1Z to 5T and 5Z, respectively) of the code converter. A trigger pulse which is applied via a circuit completed by the contact *ar* to the tape-reader causes the next following character to be read. An additional contact in the tape-reader applies a voltage to the terminal *k* as long as information is available on the tape. If the information on the tape is exhausted, the terminal *k* acquires earth potential and further trigger pulses are thus excluded.

If, on the other hand, the tape reader is situated at some distance from the multiplex arrangement, the above-mentioned large expenditure in lines would not be tolerable. In such a case the tape-reader used is of the type which delivers the 5-unit combinations in time sequence including the start and stop signals via a single twin line; in this case also however the tape-reader is controlled, by trigger pulses via the contact *ar* which must be applied to the reader through a special line. The terminal *k* is not used. The input terminals of the code converter are preceded by a series-parallel converter which stores the polarities of the individual code units and passes them on as suitable potentials via the input terminals 1T, 1Z to 5T, 5Z to the code converter where they must be available simultaneously at the instant when the pulse generator P'13 delivers a pulse. The voltage at the terminal SZ may thereby be made dependent on the polarity of the stop pulse. Since the terminal *k* is not being used, trigger pulses are delivered continuously independently of whether the tape reader has still a store of information or whether the tape has been exhausted. (The trigger pulses disappear only when a repetition process is inoperation on the transmission path). In order to ensure that only genuine message signals are transferred from the series-parallel converter through the code converter to the store S0 (that is for instance in order to be able to distinguish the 5-unit combination with five space current units from the continuous space current state) the series-parallel converter is provided with a storage device which stores each arriving start pulse. The output of this storage device is connected to the terminal X; it delivers a voltage to a gate G4 and thus creates the condition that the pulse generator P'13 can deliver a pulse. A pulse from P'13 applied to the said start unit storage device via the terminal Y may eliminate this storage device again, whereby earth potential is applied to the terminal X. A condition for the fresh storage of a signal combination in the first storage device S0 is, therefore, that a new 5-unit combination including the start pulse arrives. The time difference between the transmission of the trigger pulse and the arrival of the 5-unit combination released by it, which is noticeably larger when the distances are large because of the travelling time on the lines, has no disadvantage even if the 5-unit combination arrives at the input of the code converter as much as a full distributor revolution later. If the travelling times are even larger an additional intermediate storage device is provided which is, however, not taken into account in the embodiment according to FIGURE 1.

The arrangement according to FIGURE 1 comprises in addition to the already mentioned code converter CU 5/7 and the first storage device S0 the following essential components:

A trigger arrangement consisting of a three-stage counter chain K1 to K3 with preceeding gates G2 and G3.

A repetition arrangement consisting of a 5-stage counter chain R1 to R5 and four multivibrator circuits R6/R7, R8/R9, R10/R11, R12/R13 for instance of the same type as the individual storage elements in the first storage device S0.

Three further storage devices S1, S2 and S3 preferably of the same type as the first storage device S0; these storage devices too, consist of six individual storage elements each; they serve to store three characters which must be kept in storage for repeated transmission in case a repetition is required. The first, second and so on storage elements of the three storage devices form, each by itself, a so-called shift register.

A number of code circuits (for instance gates G21 to G32 and G33 to G44 as well as OR elements G45 to G56) which serve as change-over switches if during a repetition the signal combinations which have to be transmitted subsequentially must be taken not from the first storage device S0 but from the three storage devices S1 to S3. The change-over switching is controlled by the repetition arrangement (multivibrator circuit R6/R7).

The gates G57 to G68; these serve for reading the signal combination at the output of the storage device S1 by means of the output voltages of the distributor stages V14 and V1 to V5; the read combination is in this way translated into pulses following each other in time and separated with regard to spacing and marking polarity.

The gates G69 to G74; they are used for forming the RQ signal.

(The gates G57 to G68 and G69 to G74 respectively are controlled additionally by the repetition arrangement—multivibrator circuit R8/R9.)

The OR elements G75 and G76 in conjunction with a multivibrator circuit E1; the output voltages of the gates G57 to G74 are collected at the inputs of E1 separately for spacing and marking signals; the multivibrator circuit E1 serves essentially as a pulse shaper and is common to two channels.

A spacing pulse counter C0 to C4; it is controlled via a series of gates and counts only the pulses appearing at the T output of the multivibrator circuit E1 and included in the first six pulses of each 7-unit combination alternatingly for channel A and channel B.

A transfer control counter chain C5 to C8; it controls, on the one hand, the spacing pulse counter in such a way that its counting remains limited each time to the first six units of each 7-unit combination and, on the other hand, it controls a series of gate circuits in such a way that when the signal voltages from the multivibrator circuit E1 are transferred to the output multivibrator circuit E2 only the first six units are transmitted each time whereas the polarity of the seventh unit is made independent of the counting state of the space pulse counter. The transfer control counter itself is controlled by the distributor.

The output multivibrator circuit E2; a voice-frequency modulator, for example, may be controlled by means of the voltages delivered by it via the output terminals *a*, *b*.

Two supervisory arrangements one each for channel A and channel B represented by the multivibrator circuits C9/C10 and C11/C12; they test whether the spacing pulse counter has counted less than two or more than three spacing pulses amongst the first six units of a 7-unit combination. If this is the case, the required 3:4 relation of the spacing to marking units cannot be produced by the addition of the seventh unit and an error must have occurred. Such an error can occur, however, only as an extraordinary event, for instance when the arrangement is switched on, or when a fault has occurred at one of the contacts which is operated by the feeler levers in the punch tape apparatus. If the supervisory arrangement responds, for instance an optical and/or acoustic signal is triggered off either directly or via an intermediate relay.

The manner of operation of the arrangement will now be described for the normal operating conditions by means of FIGURE 1 and the time diagram FIGURE 2. A tape-reading machine is assumed to be connected directly to the input; therefore, the terminal *k* carries a voltage, the terminal SZ is earthed and the terminals X and Y are not used. The repetition arrangement (R1 to R13) is in the quiescent state that is all shaded circuit parts deliver a voltage at their output. The distributor V revolves, that is it switches over to the next counting stage with each pulse of the commonly applied clock pulse P0 and delivers at each step a voltage through one of the fourteen output lines. In FIGURE 2, line 1 represents the clock pulse train. In order to characterize the arrangement in time of the individual processes the pulses which are necessary for a complete distributor revolution are denoted by the numerals 1 to 14. The clock pulse (1) coincides with the start of the rise time of a pulse from the counting stage V1 (FIGURE 2, line 2), and the start of the decay time of the pulse from stage V14. At this instant, therefore, only the voltage of stage 14 is available. At the time of occurrence of the clock pulse (2) only the voltage of stage V1 will be available. As shown in FIGURE 2, the counter stage V2 begins to deliver its voltage at the time of occurrence of the clock pulse (2) and this voltage is available at the time of occurrence of the clock pulse (3). Corresponding conditions prevail for all further counter stages.

It will now be assumed that the letters of the alphabet are to be transmitted in sequence. It is also assumed that the input terminals 1T, 1Z to 5T, 5Z are already supplied with the 5-unit combination of the letter C. In line 5 of FIGURE 2 the voltages applied to the terminals 1T to 5T are represented by black bars. Since the letter C is represented in the 5-unit code by the combination ZTTTZ only 2T, 3T and 4T are filled in in black. The letter C is also assumed to have been transferred already into the storage device S0 via the code converter. In the 7-unit code the pulse sequence of the letter C is TZZTTZ(Z); in line 8 of FIGURE 2 the storage elements of the storage device S0 that contain spaces are represented by black bars. Representation of the storage on the marks is omitted because it is always the mirror image of the storage of the spaces. The letter C is also assumed to have been transferred already to the storage device S1 (line 10 of FIGURE 2). The combinations of the letters B and A which have been transmitted already are in the storage devices S2 and S3 respectively where they are stored in case repetition is required (lines 11 and 12 respectively of FIGURE 2).

At the time of occurrence of the clock pulse (1) all three inputs of the gate G2 carry voltage; consequently, the counter stage K1 of the trigger counter chain receives an input voltage also; this stage responds (line 3 of FIGURE 2) and with it also the trigger relay AR; closing of the contact *ar* causes a trigger current through the terminals of this switching contact to the tape reader (line 4 of FIGURE 2) where reading of the next following row of holes in the punched tape (letter D) commences. In consequence of the mechanical inertia of the feeler arrangement the 5-unit combination of letter C disappears only after the clock pulse (8) and the combination of the letter D is applied to the input terminals with certainty only shortly before the clock pulse 12. Now, G3 receives an input voltage on its first input from the output of the counter stage K1; the output voltage of the distributor stage V3 is applied to the second input of G3. As a consequence of this the trigger counter chain switches over to the stage K2 at the time of occurrence of the clock pulse (4) (line 3 of FIGURE 2) and thus the trigger relay AR is de-energised again; the trigger pulse (line 4 of FIGURE 2) is in this way limited to its required duration.

Between the clock pulses (11) and (12) the gate G12 receives a voltage at both its inputs; it delivers an output voltage as illustrated in line 6 of FIGURE 2. At the moment (12) the letter C is, therefore, deleted from the storage device S0; in other words the storage device reverts to its rest state (combination $\beta$) (see line 8 of FIGURE 2). The gate G4 receives voltage at both its inputs one clock pulse later (input terminal X may be disregarded here as it is not used; if the actual circuit arrangement of G4 makes it necessary, X must be supplied with a fixed voltage). The pulse generator P'13 delivers, therefore, a pulse at the time of occurrence of the clock pulse (13) (see line 7 of FIGURE 2) by which the pulse combination corresponding to the letter D is transferred from the input terminals through the code converter CU 5/7 into the storage device S0. At the time of occurrence of the clock pulse (14) the pulse generator P'14 delivers a pulse (see line 9 of FIGURE 2). In this way, the teleprinter signal for the letter D is also stored in the storage device S1; the teleprinter signal corresponding to the letter C which was stored there previously, is shifted at the same time to the storage device S2 and simultaneously the teleprinter signal allocated to the letter B previously stored in the storage device S2 is shifted to the storage device S3. The pulse combination corresponding to the letter A previously stored in the storage device S3 disappears in this process.

The above-mentioned starting conditions, with the teleprinter signal for the letter stored in the storage device S1, will now be considered again. At this time the spacing and marking outputs of the individual storage elements of S1 are applied to the reading gates G57 to G62 and G63 to G68, respectively. Corresponding pairs of these gates successively receive voltage from the distributor V. At the time of occurrence of the clock pulse (1) the output voltage of the storage element S11 is coupled through to the input of the multivibrator circuit E1. As a result the multivibrator circuit E1 assumes the state that corresponds to the first unit of the combination of the letter C (that is the spacing state T as shown in line 13 of FIGURE 2). At the time of occurrence of the clock pulse (2) the output voltage S12 is coupled to the input of E1. E1, therefore, assumes the state that corresponds to the second unit of the above-mentioned combination, that is the marking state Z. At the clock pulse (3) E1 remains in the marking state Z and then reverts to the spacing state T for two clock pulse periods. At the time of occurrence of the clock pulse (6) E1 returns to the marking state Z. At the clock pulse (7) E1 always remains in the state that it assumed at the clock pulse (6), since no storage element is provided for the seventh unit and, therefore, no reading takes place. In the present case E1 remains in the marking state Z. In line 13 of FIGURE 2 the seventh period is shown shaded. In exactly the same way a pulse combination belonging to channel B is interposed between the time of occurrence of the clock pulse (8) and the time of occurrence of the clock pulse (1) of the next following distributor revolution; this pulse combination is not shown in line 13 of FIGURE 2. By the beginning of the second revolution of the distributor the letter D has been stored in place of the letter C in the storage device S1 and this letter is thus read out during this revolution and converted into pulses following each other in time sequence.

The time intervals in which the individual stages of the transfer control counter chain C5 to C8 deliver output voltages may be seen from line 15 in FIGURE 2. At the time of occurrence of the clock pulses (2) to (7) the stage C5 applies a voltage to one input of each of the gates G77 and G78; the output voltage of the multivibrator circuit E1 which is applied to the second inputs of these gates is, therefore, effective at the corresponding input of the multivibrator circuit E2. The multivibrator circuit E2, therefore, receives the pulse sequence of the multivibrator circuit E1 (line 16 of FIGURE 2) delayed by one clock pulse period. Since, however, at the time of occurrence of the clock pulse (8) the stage C6 of the transfer control counter applies a voltage to one input of each of the gates G81 and G82 and since the second inputs of these gates are connected respectively to the outputs of the stages C2 and C3 of the spacing pulse counter, the state of the spacing pulse counter C0 to C4 at this instant decides the polarity of the seventh unit fed into E2. If, for instance, the spacing pulse counter has counted three spacing pulses, the output voltage delivered by the stage C3 is then effective via the AND element G82 and the OR element G86 at that input of the multivibrator circuit E2 which represents a marking signal for the channel A. If, however, the spacing pulse counter had counted only two spacing pulses, that is, therefore, up to stage C2 the output voltage of this stage would act on the multivibrator circuit E2 via the gates G81 and G85 and would cause a spacing pulse to appear as the seventh unit of the combination.

During the time intervals allocated to the stages C7 and C8 of the transfer control counter, corresponding processes for the signals of channel B take place. In order to distinguish easily in the receiving arrangement of the multiplex system the signals belonging to channels A and B the signals of channel B are transmitted in general with mirror-image polarity. This change of polarity is achieved for the first six units of each combination by crossing the connecting paths during the transfer of the signals from the multivibrator circuit E1 into the multivibrator circuit E2. The output leads of the counter stages C2 and C3 are interchanged correspondingly for the channel B for the seventh unit.

The spacing pulse counter is brought into the rest state (C0) at the clock pulses (1) and (8) via the OR elements G87. The control of the further stages C1 to C4 is carried out via the OR elements G88 to G91 which are preceded by eight AND elements G92 to G99. From FIGURE 1 it may be seen that for the response of each individual counter stage three conditions must be fulfilled at the inputs of one of the two AND elements associated therewith:

(1) The preceding counter stage must always have responded and must, therefore, deliver a voltage.

(2) The T side of the multivibrator circuit E1 must deliver a voltage, that is E1 must have responded to a spacing pulse.

(3) One of the transfer control counter stages C5 (for channel A) or C7 (for channel B) must deliver a voltage.

Line 14 in FIGURE 2 shows that, for instance, for the transmission of the code signal corresponding to the letter C in channel A the counter stage C1 responds at the clock pulse (2), the counter stage C2 at the clock pulse (5), and the counter stage C3 at the clock pulse (6). At the latest at the clock pulse (7) all the spacing pulses within the first six units of a combination have been counted; at the clock pulse (8), as mentioned hereinbefore, the counter state (C2 or C3) is transferred to the output stage E2. At the same time the outputs of the counter stage C0, C1 and C4 are applied via three AND elements G101 to G103 (which are also suplied with a voltage from the distributor stage V7) and an OR element G100 to the input of the stage C10 of the multivibrator circuit C9/C10. If one of the last-mentioned three counter stages should deliver a voltage at the time of occurrence of the clock pulse (8)—this is only the case if less than two or more than three spacing pulses have been counted—an alarm is triggered off, since, in general, this means that a mutilated combination has reached the store S1 of channel A. This combination must, therefore, be deleted and a cancel key LT is provided in the repetition arrangement for this purpose. Alternatively the deletion may be carried out automatically in dependence on the response of the supervising arrangement. When the cancel key is provided, the supervising multivibrator circuit C9/C10 may be returned into its rest state and the alarm signal may be cancelled by the operation of this key. The multivibrator circuit C11/C12 with the gates G104 to G107 serves in a corresponding manner for the supervision of the signals of channel B.

The manner of operation of the repetition arrangement can only be described by observing several revolutions of the distributor. For this reason the time diagram FIGURE 3 is used in place of FIGURE 2 for the further description. The first revolution of the distributor in FIGURE 3 corresponds exactly to that of FIGURE 2. The representation has, however, been simplified in several lines. The switching times of the individual distributor stages (line 2 of FIGURE 2) have been omitted because the numbered clock pulses in line 1 of FIGURE 3 make the time scale sufficiently clear. Also the representations of the processes occurring during the transfer of the signals from the multivibrator circuit E1 to the multivibrator circuit E2 with counting of the spacing pulses corresponding to lines 14 to 17 of FIGURE 2 have been omitted because these processes take place without alteration during each repetition process. The line 18 in FIGURE 3 corresponds to line 13 in FIGURE 2, but lines 12 to 17 of FIGURE 3 represent the sequence in time of the processes within the repetition arrangement (R1 to R13) during a repetition process.

It will be assumed that the repetition arrangement is initially in its rest state and that, at some instant after the clock pulse (14) of the third revolution (FIGURE 3) and prior to the clock pulse (14) of the fourth revolution, the receiving arrangement applies a pulse via the terminal PR (FIGURE 1) to the input of R11 of the multivibrator circuit R10/R11 such that this circuit changes from the state in which R10 is conductive to the state in which R11 is conductive. The period referred to above is shown shaded in line 16 of FIGURE 3. The appearance of the voltage pulse at the terminal PR is caused by the fact that the receiving arrangement has received either a signal with an incorrect mark-space ratio or an RQ signal (the RQ signal having been transmitted by the distant station, for example, because the letter D was received there wrongly); in both cases a repetition process has to be carried out. The exact time at which the pulse reaches the terminal PR depends on the one hand on the travelling time on the transmission path and on the other hand on the phase difference between the transmitter and receiver distributors. The large tolerance in the time at which the pulse may arrive usually makes it unnecessary to provide any adjustment of the phase difference between the transmitter and receiver distributors even with multi-path transmission when the travelling times on different transmission paths may be different. If R11 responds within the shaded region illustrated in line 16, the repetition counter chain R1 to R5 is started by the next following clock pulse (clock pulse (14) in the fourth revolution), the multivibrator circuits R6/R7 and R8/R9 are changed over, and the multivibrator circuit R10/R11 is returned into its rest state. Moreover, the pulse generator P'14 is stopped for a short time so that one pulse is missed (line 9 in FIGURE 3) assuming that the multivibrator circuit R12/R13 is in its rest state (otherwise an intermediate AND element G6 would block the output of R11). The disappearance of the output voltage of R7 of the multivibrator circuit R6/R7 blocks all the gates G21 to G32. The gates G33 to G44, on the other hand, are opened and the output voltages of the storage device S3 are, therefore, applied to the inputs of the storage device S1. The disappearance of the output voltage of R5 blocks the gate G2 and thus prevents the trigger arrangement from starting. Consequently the trigger pulses (line 4) disappear and the tape reader is stopped. The gate G12 is also blocked so that the combination stored in S0 cannot be deleted. Since the pulse generator P'13 also stops (line 7), the combination stored in S0 remains unchanged for the duration of four further distributor revolutions (line 8), that is until the repetition counter chain has completed a cycle and R5 delivers a voltage again. As line 15 in FIGURE 3 shows, the multivibrator R8/R9 remains in the set state for the duration of one revolution only; during this time the gates G57 to G68 are blocked and the gates G69 to G74 are opened. The output voltages of the distributor stages V14 and V1 to V5 are now applied via the last-mentioned gates and via G75 to G76 to the input of E1; the sequence of operations determined by the circuit arrangement ensures that the pulse combination corresponding to the RQ signal is formed (line 18, fifth revolution). The pulse from the pulse generator P'14 in the fifth revolution causes the pulse combination corresponding to the letter F to be transferred from S1 to S2, the pulse combination corresponding to the letter E to be transferred from S2 to S3, and the pulse combination corresponding to the letter D to be transferred from S3 to S1 (lines 10, 11 and 12). Since in the sixth revolution the gates G69 to G74 are blocked again and the gates G57 to G68 are opened again, the output voltages of the storage device S1 are fed to the gates G75 and G76. Thus the pulse combination corresponding to the letter D is transmitted now for the second time. A second change of storage occurs within S1, S2, S3 as a result of the pulse from P'14 in the seventh revolution; thereby the pulse combination corresponding to the letter E arrives in the storage device S1 and is thereafter fed to the gates G75 and G76 for transmission. The same sequence occurs for the third time in the eighth revolution; thereby the code combination corresponding to the letter F arrives in the storage device S1; at the same time R6/R7 returns to the clear or rest state. After the repetition of the pulse combination corresponding to the letter F, that is at the time of occurrence of the clock pulse (14) of the eighth revolution, the storage device S1 accepts the combination corresponding to the letter G which has been maintained in the storage device S0. Since at this moment the run down of the repetition counter chain (R1 to R5) has also finished, the transmission of the message which has been interrupted by the repetition process for four distributor revolutions is now continued.

As mentioned before, a falsified combination in the storage arrangement S1, S2, S3 can give rise to continuous repetitions. The usual procedure to delete a falsified combination in the storage arrangement consists in delaying the triggering off of the repetition process for a period of one distributor revolution. In the above mentioned example (FIGURE 3) this would have the effect that in the fifth revolution line 18 the letter G would come first in place of RQ; RQ would follow in the sixth revolution; and a repetition of the letters E, F, and G would follow in the seventh to ninth revolutions. The falsified combination which was assumed to be in the storage arrangement in place of the letter D would, therefore, simply be neglected.

To delay the start of the repetition process the multivibrator circuit R12/R13 is used in connection with the cancel key LT and the capacitor C (FIGURE 1). In the normal position of the key the capacitor C is charged via the terminal U from a voltage source which is not shown. Operation of the key causes the capacitor C to discharge into the input of R13; the resulting voltage pulse causes R12/R13 to change over so that the output voltage of R12 disappears; because of the intermediate gate G6, and since R11 has responded as a result of a pulse applied to PR, the counter chain R1 to R5 cannot start, nor can the multivibrator circuits R6/R7, R8/R9 change over to the set state, nor can R10/R11 return to its rest or clear state. By means of the output voltage of R11 and a pulse from the pulse generator P14, R12/R13 must first be returned to its clear state, whereby at the same time the output voltage of R13 acts via G7 upon the further pulse generator P'14 and causes the delivery of a pulse from this latter pulse generator. By this pulse a combination is transferred from the storage device S0 (in the example that of the letter G) to the storage device S1; the combination that was previously in S1 is passed to S2 and the combination that was in S2 is passed to S3; the (faulty) combination previously stored in S3 disappears. Only after this process is completed do R11 and R12 deliver simultaneously an output voltage to the gate G6 which is thus opened and the next following pulse from P14 can initiate the repetition process in the manner already described.

It has already been indicated that in the arrangement illustrated in FIGURE 1 the distributor V1 to V14 is common to two channels. The arrangements for the second channel are completely identical with the arrangement so far described, except that the distributor connections are displaced by seven steps each. The multivibrator circuits E1 and E2 with the intervening gates, the space pulse counter, the transfer control counter chain and the supervisory arrangements are represented in FIGURE 1 for two channels.

If the system is to be extended, for instance, to four channels the distributor may be increased to 28 stages either by the addition of a further 14 stages after the existing stages or by interleaving the additional stages with the existing stages. Alternatively two arrangements of the type described may be provided for two channels each, the output stage E2 being used for all four channels jointly. In this case the signals of the two channel pairs are applied to the output stage through decoupled inputs to which are applied different clock pulse trains. The two clock pulse trains must have the same pulse-repetition frequency, but there must be a phase difference between them equal to half a pulse period, that is a phase difference of 180°. In this case the steps of the two channel pairs are shortened to half and are interlocked so that they alternate in time.

To complete the present description, the transmission of the combinations $\beta$ and $\alpha$ will be described. If the transmission of information from the tape reader is interrupted, earth potential appears either at the terminal $k$ or at the terminal X. In both cases the pulse train from the pulse generator P'13 is interrupted so that the storage device S0 remains in the rest state (corresponding to $\beta$) during the next following and all further distributor revolutions. The combination $\beta$ arrives in the storage device S1 (and furthermore also in the storage devices S2 and S3) on the occurrence of pulses from the pulse generator P'14 and is transmitted in the manner already described. After the clearing signal has been given, the terminal SZ carries voltage, so that, after the storage device S0 has been changed to the rest state (corresponding to $\beta$) at the clock pulse (12), it is changed over to the combination $\alpha$ at the clock pulse (13); in this case, therefore, the combination $\alpha$ is transmitted.

Details of the circuit hereinbefore described may of course be varied without departing from the scope of the appended claims. For example, means may be provided to ensure that the storage device S0 assumes the state corresponding to the combination $\alpha$ at the clock pulse (12) after the clearing signal has been transmitted and that it remains continuously in this state during the following distributor revolutions. Further, the stage R1 of the repetition counter chain may, for instance, take over the work normally done by the R8 output of the multivibrator circuit R8/R9. The repetition arrangement may be varied in many ways, provided its fundamental function is maintained. The individual bi-stable circuits may be designed in any of the various known ways and may comprise vacuum tubes (for instance double triodes), thyratrons, transistors, magnetic cores, or ferromagnetic components with rectangular hysteresis loops. The individual counter chains may be constructed linearly or according to the binary principle (that is from single bi-stable circuits). The various gates may consist mainly of rectifiers or transistors, or may contain magnetic cores. Such changes do not effect the principle of the circuit according to the invention.

It is an important advantage of the circuit arrangement according to the invention that it may be constructed from a few types of basic components and with a uniform technique. For instance, the code converters and all the gates may consist mainly of rectifiers of the same type and of resistors of the same size. All the remaining arrangements, that is storage elements, trigger and repetition arrangements, bi-stable circuits, transfer control and space pulse counters and the supervisory arrangement, may contain as main components either only high vacuum double triodes or only cold cathode thyratrons or only transistors.

What I claim as my invention and desire to secure by Letters Patent of the United States is:

1. Teleprinter signal transmission apparatus comprising a code converter for translating teleprinter signals from a first code to a second code, a pulse distributor, a first storage device controlled by the output of the code converter, a second storage device, normally operative means for passing the character transferred to the first storage device also to the second storage device, at least two further storage devices, means responsive to pulses from the pulse distributor for transferring characters sequentially from the second storage device to successive ones of the further storage devices, normally inoperative means for transferring the character stored in the last storage device to the second storage device, a reading device for reading out the pulse combination of the character stored in the second storage device in time sequence, and means responsive to the receipt of a repetition-request signal for making said normally operative means inoperative and said normally inoperative means operative so that the reading device reads out in succession the characters passed to the second storage device from the last storage device.

2. Teleprinter signal transmission apparatus comprising a code converter for translating characters from a first teleprinter code to a second teleprinter code, a pulse distributor, a first storage device connected to the output of the code converter, a second storage device, normally operative means for passing each character transferred to the first storage device also to the second storage device, at least two further storage devices, means responsive to pulses from the pulse distributor for transferring characters sequentially from the second storage device to successive ones of the further storage devices, normally inoperative means for transferring characters from the last storage device to the second storage device, a reading device controlled by the pulse distributor for reading out in time sequence the pulses constituting the pulse combination of the character stored in the second storage device, means for counting the number of spacing pulses in said read-out pulse combination, means controlled by said counting means for adding a further pulse to said combination to produce a predetermined mark-space ratio, and means responsive to the receipt of a repetition-request signal for causing the transmission of a corresponding repetition-request signal and for making said normally operative means inoperative and said normally inoperative means operative.

3. Teleprinter apparatus comprising a code converter for translating teleprinter signals in a 5-unit code to teleprinter signals in a 6-unit code, a pulse distributor, a first 6-unit storage device, means responsive to a pulse from the pulse distributor for transferring the six units of a character simultaneously from the code converted to the first storage device, means responsive to a pulse from the pulse distributor for inserting an idle signal in the first storage device, a second 6-unit storage device, means responsive to a pulse from the pulse distributor for transferring the six units of a character simultaneously through first gate circuits from the first storage device to the second storage device, a 6-unit shifting register controlled by the pulse distributor and having its first stage fed from the output of the second storage device and its last stage connected to the input of the second storage device through second gate circuits, a reading device controlled by the pulse distributor for scanning the second storage device, means for counting the number of spaces in each 6-unit combination read out of the second storage device, means for adding a seventh pulse to said 6-unit combination to produce a predetermined mark-space ratio, and means responsive to the receipt of a repetition-request signal for causing the transmission of a corresponding repetition-request signal and for blocking the first gate circuits and opening the second gate circuits.

4. Teleprinter signal transmission apparatus comprising a code converter, a first storage device, a repetition device, connecting paths between the code converter and the first storage device, means for inserting an idle signal in the first storage device before the transfer thereto of a character from the code converter, a multi-stage shifting register, connecting paths controlled by the repetition device between the first storage device and the first stage of the shifting register, connecting paths controlled by the repetition device between the last stage of the shifting register and the first stage of the shifting register, a reading device controlled by the repetition device for controlling the state of a first bi-stable device at a number of successive instants of time in dependence on the character stored in the first stage of the shifting register, means controlled by the repetition device for controlling the state of the first bi-stable device at a number of successive instants of time in dependence on the code combination representing the repetition-request signal, means for counting the number of spacing signals in each character combination at the output of the first bi-stable device, and means for controlling the state of a second bi-stable device at a number of successive instants of time in dependence on the state of the first bi-stable device and on the number of spaces counted by the counting means.

5. Teleprinter signal transmission apparatus comprising a code converter for translating characters from a first teleprinter code to a second teleprinter code, a pulse distributor, a first storage device connected to the output of the code converter, a second storage device, normally operative means for passing each character transferred to the first storage device also to the second storage device, at least two further storage devices, means responsive to pulses from the pulse distributor for transferring characters sequentially from the second storage device to successive ones of the further storage devices, normally inoperative means for transferring characters from the last storage device to the second storage device, a reading device controlled by the pulse distributor for reading out in time sequence the pulses constituting the pulse combination of the character stored in the second storage device, means for counting the number of spacing pulses in said read-out pulse combination, means controlled by said counting means for adding a further pulse to said pulse combination to produce a predetermined mark-space ratio, alarm means controlled by said counting means for producing an indication if the number of spaces counted is such that said predetermined mark-space ratio cannot be produced, and means responsive to the receipt of a repetition-request signal for making said normally operative means inoperative and said normally inoperative means operative.

6. Teleprinter signal transmission apparatus comprising a code converter, a first storage device, connecting paths between the code converter and the first storage device, a pulse generator controlling the paths between the code converter and the first storage device, means for disabling the said pulse generator when no signals are being applied to the code converter, means for inserting an idle signal in the first storage device, a multi-stage shifting register, normally effective connecting paths between the first storage device and the first stage of the shifting register, normally ineffective connecting paths between the last stage of the shifting register and the first stage of the shifting register, a reading device for reading out the code combinations stored in the first stage of the shifting register, and means responsive to the receipt of a repetition-request signal for making said normally effective paths ineffective and said normally ineffective paths effective.

7. Two-channel teleprinter signal transmission apparatus comprising a first storage device for each channel, means for inserting idle signals and message signals in each first storage device, a multi-stage shifting register for each channel, normally effective connecting paths between each first storage device and the first stage of the corresponding shifting register, normally ineffective connecting paths between the last stage and the first stage of each shifting register, a reading device for controlling the state of a first bi-stable device at a number of successive instants of time in dependence alternately on the characters stored in the first stage of said two shifting registers, means for controlling the state of a second bi-stable device at a number of successive instants of time in dependence on the state in the first bi-stable device, and means for making said normally effective paths ineffective and said normally ineffective paths effective.

8. Two-channel teleprinter signal transmission apparatus comprising a first 6-unit storage device for each channel, means for inserting idle signals and message signals in each first storage device, a multi-stage 6-unit shifting register for each channel, normally effective connecting paths between each first storage device and the first stage of the corresponding shifting register, normally ineffective connecting paths between the last stage and the first stages of each shifting register, a reading device for controlling the state of a first bi-stable device at six successive instants of time in dependence on the character stored in the first stage of one of said two shifting registers and at six further successive instants of time in dependence on the character stored in the first stage of the other of said two shifting registers, means for counting the number of times the first bi-stable device is in the spacing state during the six successive instants corresponding to each character read out, means for controlling the state of a second bi-stable device at the six successive instants of time corresponding to one character in dependence on the state of the first bi-stable device at those instants and on the state of the counting means at a seventh instant following said six successive instants, and means responsive to a signal for making said normally effective paths ineffective and said normally ineffective paths effective.

9. Teleprinter apparatus as claimed in claim 3, wherein the counting means consists of first, second, third, fourth and fifth stages representing respectively zero, one, two, three and four spacing pulses, and including first means for ascertaining if said third stage of said counting means is operative at the end of a 6-unit combination and means, responsive to said first means, for producing the seventh pulse as a spacing pulse, second means for ascertaining if the fourth stage of the counting means is operative at the end of a 6-unit combination, means, responsive to said second means, for producing the seventh pulse as a marking pulse, third means for ascertaining if the first, second or fifth stage of the counting device is operative at the end of a 6-unit combination, and means, responsive to said third means, for producing an alarm signal.

10. Teleprinter apparatus as claimed in claim 7, including means operative during the transmission of characters belonging to one channel and responsive to a space in the first bi-stable device to produce a state representing a space also in the second bi-stable device, and means operative during the transmission of characters belonging to the other channel and responsive to a space in the first bi-stable device to produce a state representing a mark in the second bi-stable device and responsive to a mark in the first bi-stable device to produce a state representing a space in the second bi-stable device.

11. Apparatus as claimed in claim 8 including first means for ascertaining, during the transmission of characters belonging to one channel, when the state of the first bi-stable device represents a space at the same time as the counting device makes a count of two, means, responsive to said first means, to produce a state representing a space in the second bi-stable device, second means for ascertaining, during the transmission of characters belonging to the other channel, when the state of the first bi-stable device represents a space at the same time as the counting device makes a count of two, and means, responsive to said second means, to produce a state representing a mark in the second bi-stable device and responsive to a mark in the first bi-stable device to produce a state representing a space in the second bi-stable device.

References Cited in the file of this patent

UNITED STATES PATENTS

| | | |
|---|---|---|
| 2,518,405 | Van Duuren | Aug. 8, 1950 |
| 2,706,215 | Van Duuren | Apr. 12, 1955 |
| 2,805,278 | Van Duuren | Sept. 3, 1957 |
| 2,903,514 | Van Duuren | Sept. 8, 1959 |